Aug. 2, 1932.   L. A. PARADISE   1,869,981
CUTTER BAR
Filed Sept. 6, 1929

WITNESS
A. D. McLeay

INVENTOR
Louis A. Paradise

Patented Aug. 2, 1932

1,869,981

UNITED STATES PATENT OFFICE

LOUIS A. PARADISE, OF MOLINE, ILLINOIS, ASSIGNOR TO DEERE & COMPANY, OF MOLINE, ILLINOIS, A CORPORATION OF ILLINOIS

CUTTER BAR

Application filed September 6, 1929. Serial No. 390,688.

On the drawing

Figure 2:
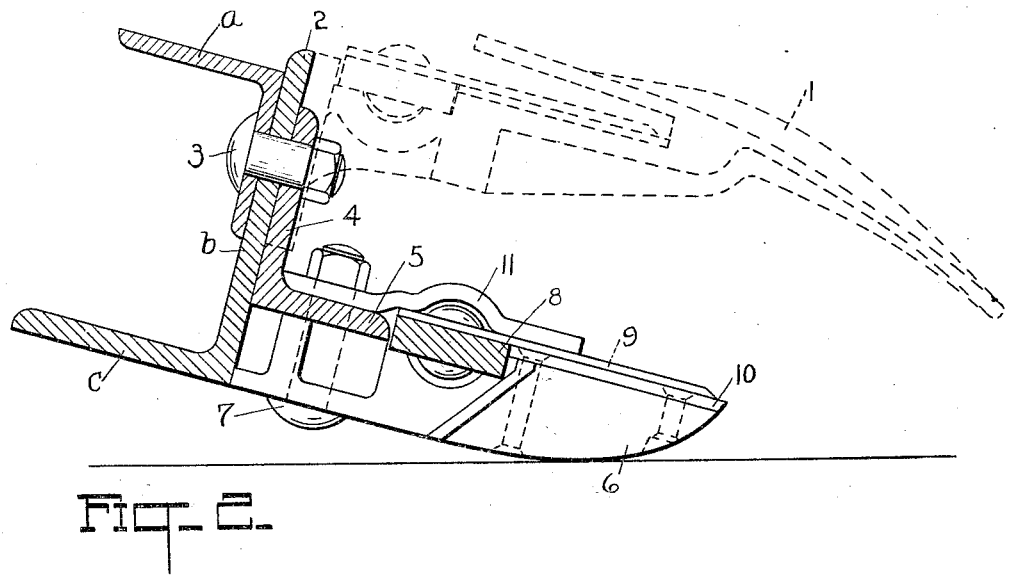
Figure 2 is a sectional view on line 2—2 of Figure 1.
Figure 1:
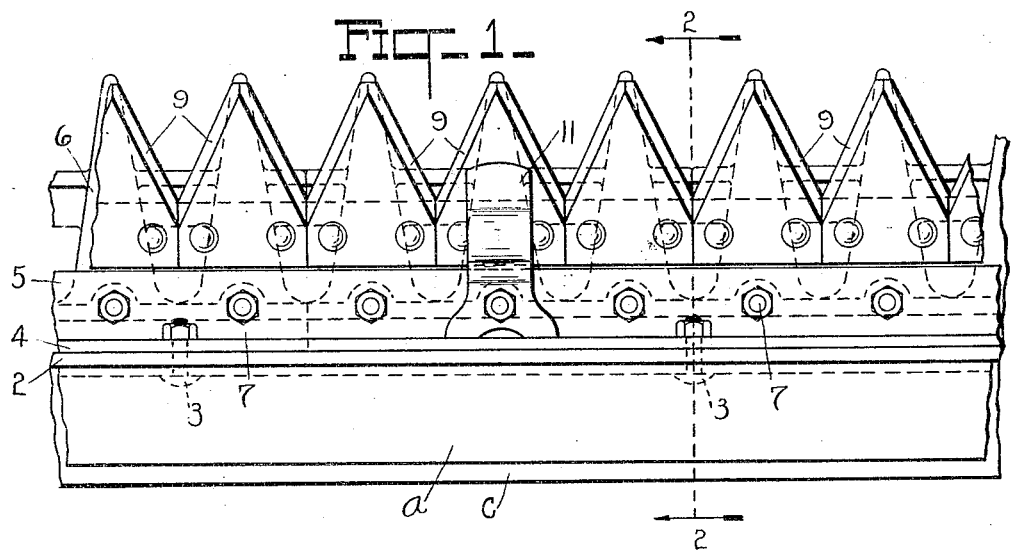
Figure 1 is a top view of the cutter bar assembly.

The guard finger 1 shown in dotted lines in Figure 2, is of a type commonly used and is generally cast in groups of two or more which are secured in place on the front frame bar 2 of a harvester by bolts 3, the same bolts being utilized to attach the finger bar to the front frame bar 2. From this structure it is evident that if it is desired to cut closer to the ground because of the nature of a particular crop, such as soy beans, a different cutting mechanism structure must be employed and to that end I have provided a supplemental device to be attached to the frame bar 2, after the guard fingers 1 have been detached by loosening and removing the bolts 3.

The frame bar 2 is made of steel L bar and on the vertical leg $b$ thereof the cutting mechanism is mounted, utilizing the same bolts 3 to secure either type of device shown. The cutting mechanism, shown in full lines in the drawing, includes a finger bar 4 made of steel L bar and of smaller dimensions than the bar 2, the vertical leg of the finger bar 4 being secured to the vertical leg $b$ of the bar 2 by the bolts 3. The horizontal leg 5 of the finger bar 4 extends forwardly and is a sufficient distance above the plane of the horizontal leg $c$ of the bar 2 so that the bottom of the guard finger 6 is in said plane so as to move over the stubble without gathering soil or débris of the harvest. The rear end of the guard finger 6 is flat and firmly in contact with the vertical leg $b$ of the bar 2 to add to the rigidity of the structure.

The guard fingers 6 are secured to the under side of the horizontal leg 5 of the bar 4 by bolts 7, and operating in the guard fingers in the usual manner is the knife bar 8 carrying cutting sections 9 which cooperate with ledger plates 10 to sever the plants being harvested. Keeper plates 11 are secured on the upper side of the leg 5, of the bar 4 by the bolts 7 and, as commonly used, hold the knife bar in proper relation to the ledger plates. The bar 4, guard fingers 6 and the keepers 11 are assembled and supplied as a complete unit and when mounted on the bar 2, the knife bar carrying the sections 9, is readily inserted at one end of the assembled unit, using the same knife bar that operated in the guard fingers 1.

My device has proven very effective in harvesting crops where it is desirable to cut close to the ground and the change from one cutting device to the other can be quickly and readily made with considerable saving of time and labor.

What I claim is—

1. The combination of an L bar forming the front frame bar of a harvester, a leg of said bar disposed vertically, and a bottom leg extending rearwardly, a supplemental similar L bar having its vertical leg secured to the vertical leg of the first mentioned bar and having a horizontal leg extending forwardly, guard fingers mounted on said forwardly extending leg and having their lower side in the horizontal plane of the rearwardly extending leg of the first mentioned bar, and means to secure said bars together.

2. The combination of an L bar forming the front frame bar of a harvester, a leg of said bar disposed vertically, and a bottom leg extending rearwardly for attachment to a harvester frame, a supplemental similar L bar having its vertical leg secured to the vertical leg of the first mentioned bar, and a horizontal leg extending forwardly above the plane of the horizontal leg of the first mentioned bar, guard fingers mounted on the horizontal leg of the supplemental bar and having their under side in the horizontal plane of the lower side of the horizontal leg of the first mentioned bar, and means to secure said bars together.

3. The combination of an L bar forming the front frame bar of a harvester, a leg of said bar disposed vertically, and a bottom leg extending rearwardly, a supplemental similar L bar having its vertical leg secured to the vertical leg of the first mentioned bar and having a horizontal leg extending forwardly, and guard fingers mounted on the forwardly extending leg, and means to secure said bars together.

4. The combination of an L bar forming the front frame bar of a harvester, a leg of said bar disposed vertically, and a bottom leg extending rearwardly, a supplemental similar L bar having its vertical leg secured to the vertical leg of the first mentioned bar and having a forwardly extending horizontal leg, guard fingers mounted on the forwardly extending leg and having their rear ends flattened and in contact with the forward face of the frame bar, and means to secure the finger bar to the frame bar.

LOUIS A. PARADISE.